US011964308B2

(12) United States Patent
Chen et al.

(10) Patent No.: US 11,964,308 B2
(45) Date of Patent: Apr. 23, 2024

(54) MOLTEN SALT ULTRASONIC CLEANING MACHINE, AND MOLTEN SALT ULTRASONIC CLEANING METHOD

(71) Applicant: JIANGSU XCMG CONSTRUCTION MACHINERY RESEARCH INSTITUTE LTD., Jiangsu (CN)

(72) Inventors: Shangong Chen, Jiangsu (CN); Xuemei Zong, Jiangsu (CN); Guangcun Wang, Jiangsu (CN)

(73) Assignee: JIANGSU XCMG CONSTRUCTION MACHINERY RESEARCH INSTITUTE LTD., Xuzhou (CN)

(*) Notice: Subject to any disclaimer, the term of this patent is extended or adjusted under 35 U.S.C. 154(b) by 41 days.

(21) Appl. No.: 17/563,236

(22) Filed: Dec. 28, 2021

(65) Prior Publication Data

US 2023/0102727 A1 Mar. 30, 2023

(30) Foreign Application Priority Data

Sep. 29, 2021 (CN) .......................... 202111151000.8

(51) Int. Cl.
*B08B 3/10* (2006.01)
*B08B 3/12* (2006.01)

(52) U.S. Cl.
CPC ................ *B08B 3/12* (2013.01); *B08B 3/102* (2013.01)

(58) Field of Classification Search
CPC .. B08B 3/102; B08B 3/12; C23G 1/28; C23G 1/30; C23G 1/32; C23G 1/34
See application file for complete search history.

(56) References Cited

U.S. PATENT DOCUMENTS 3,320,797 A 5/1967 Iichi et al.
4,627,898 A * 12/1986 Ghandehari .............. C25C 3/34 205/368
2008/0236620 A1* 10/2008 Shih .......................... B08B 3/12 134/28

FOREIGN PATENT DOCUMENTS

CN 103042006 A 4/2013
CN 104889106 A 9/2015
(Continued)

OTHER PUBLICATIONS

CN111085496—Machine Translation (Year: 2020).*
(Continued)

*Primary Examiner* — Marc Lorenzi
(74) *Attorney, Agent, or Firm* — Calfee, Halter & Griswold LLP

(57) ABSTRACT

The present invention discloses a molten salt ultrasonic cleaning machine. The molten salt ultrasonic cleaning machine includes a tank body, a molten salt heating system, an ultrasonic application system and a stirring system, wherein the tank body is configured to accommodate molten salt and a to-be-cleaned workpiece; the tank body includes a bottom wall, and a side wall arranged circumferentially in a surrounding way; the molten salt heating system is configured to heat the molten salt in the tank body; the ultrasonic application system is configured to apply ultrasonic impact to the to-be-cleaned workpiece in the tank body; and the stirring system includes a stirring rod which is rotatably arranged in the tank body. When the molten salt ultrasonic cleaning machine provided by the present invention cleans a workpiece, the stirring rod rotates to improve the flowability of the molten salt. In combination with the ultrasonic impact, rapid removal of pollutants in the complex space of the workpiece and pollutants on the bottom layer of the surface is accelerated, so that the cleaning efficiency is
(Continued)

improved. Moreover, the improvement of the molten salt flowability can promote complete reaction between the unreacted paint and residues which float on the surface of the liquid level, and the molten salt, so that the quantity of generated waste gas is reduced.

12 Claims, 5 Drawing Sheets

(56) References Cited

FOREIGN PATENT DOCUMENTS

| | | | | | |
|---|---|---|---|---|---|
| CN | 108315251 | A | | 7/2018 | |
| CN | 207694312 | U | | 8/2018 | |
| CN | 208083000 | U | | 11/2018 | |
| CN | 109127582 | A | | 1/2019 | |
| CN | 109706465 | A | | 5/2019 | |
| CN | 111085496 | A | * | 5/2020 | |
| CN | 111185442 | A | | 5/2020 | |
| CN | 210730403 | U | | 6/2020 | |
| CN | 111589782 | A | | 8/2020 | |
| CN | 111614336 | A | * | 9/2020 | |
| CN | 112545330 | A | | 3/2021 | |
| JP | 02293528 | A | | 12/1990 | |
| KR | 900007540 | Y1 | * | 8/1990 | |
| WO | WO-9806485 | A1 | * | 2/1998 | ............. B01F 13/08 |

OTHER PUBLICATIONS

KR900007540—Machine Translation (Year: 1990).*
CN111614336—Machine Translation (Year: 2020).*
Office Action from CN Application No. 202111151000.8 dated Apr. 25, 2022.

* cited by examiner

MOLTEN SALT ULTRASONIC CLEANING MACHINE, AND MOLTEN SALT ULTRASONIC CLEANING METHOD

RELATED APPLICATIONS

This application claims priority to and the benefit of Chinese Patent Application No. 202111151000.8, filed on Sep. 29, 2021, the entire disclosure of which is incorporated by reference herein.

FIELD OF THE DISCLOSURE

The present disclosure relates to the technical field of workpiece cleaning, and in particular, to a molten salt ultrasonic cleaning machine, and a molten salt ultrasonic cleaning method.

BACKGROUND OF THE DISCLOSURE

Integrated cleaning of pollutants such as paint, oil stain, carbon deposit and the like on the surfaces of parts is a key link of remanufacturing, machining, detecting, assembling and coating the parts. For the key parts such as a hydraulic valve, a pump, a motor and an engine, the hazards of the paint, the oil stain, the carbon deposit and other pollutants are particularly serious.

A paint remover, manual scraping and mechanical polishing are mostly used to clean the paint, the oil stain, the carbon deposit and other pollutants on the surfaces of the parts such as the hydraulic valve, the pump, the motor and the engine, but these methods all have the problems such as incomplete cleaning, high environmental pollution and proneness to damage to the surfaces of the parts. In recent years, the molten salt ultrasonic composite cleaning technology has shown advantages in the cleaning of multiple polluted layers. Through high-temperature molten salt reaction and ultrasonic cavitation stripping and under the coupling action of multiple physical fields, the paint, oil stain, carbon deposit and other polluted layers are removed.

SUMMARY OF THE DISCLOSURE

The present invention provides a molten salt ultrasonic cleaning machine, and a molten salt ultrasonic cleaning method, thereby improving the cleaning efficiency.

According to a first aspect of the present invention, a molten salt ultrasonic cleaning machine is provided. The molten salt ultrasonic cleaning machine includes: a tank body, configured to accommodate molten salt and a to-be-cleaned workpiece, and including a bottom wall, and a side wall arranged circumferentially in a surrounding way; an ultrasonic application system, configured to apply ultrasonic impact to the to-be-cleaned workpiece in the tank body; a molten salt heating system, configured to heat the molten salt in the tank body; and a stirring system, including a stirring rod which is rotatably arranged in the tank body.

In some embodiments, the stirring rod is laid flat on the bottom wall, and a central axis and a rotation axis of the stirring rod are perpendicular to each other.

In some embodiments, the stirring system further includes a driving assembly arranged outside the bottom wall, and the driving assembly is magnetically connected to the stirring rod arranged inside the bottom wall.

In some embodiments, the driving assembly includes a driving device, a magnet rotating disc and at least two intermediate magnets; the magnet rotating disc is connected to a main shaft of the driving device; the at least two intermediate magnets are arranged on one side of the magnet rotating disc close to the bottom wall; and the magnetism of each intermediate magnet is opposite to the magnetism of the stirring rod, so that the stirring rod is driven by a magnetic force to rotate with the magnet rotating disc In some embodiments, a first end of each intermediate magnet is connected to magnet rotating disc, and a second end of the intermediate magnet is not in contact with bottom wall.

In some embodiments, the least two intermediate magnets include a first intermediate magnet and a second intermediate magnet; the first intermediate magnet and a first end of the stirring rod are arranged correspondingly; and the second intermediate magnet and a second end of the stirring rod are arranged correspondingly.

In some embodiments, the stirring rod includes a stirring rod body and a coating arranged outside the stirring rod body; and the stirring rod body is made of samarium cobalt magnet, and the coating is made of nanometer ceramic.

In some embodiments, the stirring system further includes a protective net covering an outer side of the stirring rod; and the protective net is fixedly arranged on the bottom wall.

In some embodiments, the stirring system includes at least two stirring rods which are uniformly distributed on the bottom wall.

In some embodiments, the ultrasonic application system includes an ultrasonic vibrator attached to the side wall.

In some embodiments, the molten salt ultrasonic cleaning machine further includes a tank cover, a gas sensor and a controller, wherein the tank cover is openably arranged relative to the tank body to close or open the tank body; and when the molten salt ultrasonic cleaning machine is in a cleaning state, the tank cover closes the tank body, the gas sensor monitors the quantity of waste gas generated in the workpiece cleaning process, and the controller controls the rotating speed of the stirring rod according to the quantity of the waste gas.

According to a second aspect of the present invention, a molten salt ultrasonic cleaning method is provided. The molten salt ultrasonic cleaning method includes the following steps: controlling a tank cover to move relative to the tank body so as to close the cover body, and controlling the ultrasonic application system to start so as to clean a workpiece; acquiring the quantity of waste gas generated in the workpiece cleaning process; and controlling the rotating speed of the stirring rod and the shutdown time of the ultrasonic application system according to the quantity of the waste gas.

In some embodiments, the step of controlling the rotating speed of the stirring rod according to the quantity of the waste gas includes: turning on the stirring system by a controller to rotate the stirring rod when the quantity of the waste gas is in a set range; and turning off the stirring system and the ultrasonic application system by the controller to end cleaning when the quantity of the waste gas is less than a minimum of the set range.

Based on the technical solution provided by the present invention, the molten salt ultrasonic cleaning machine includes a tank body, a molten salt heating system, an ultrasonic application system and a stirring system, wherein the tank body is configured to accommodate molten salt and a to-be-cleaned workpiece; the tank body includes a bottom wall, and a side wall arranged circumferentially in a surrounding way; the molten salt heating system is configured to heat the molten salt in the tank body; the ultrasonic application system is configured to apply ultrasonic impact to the to-be-cleaned workpiece in the tank body; and the stirring system includes a stirring rod which is rotatably arranged in the tank body. When the molten salt ultrasonic cleaning machine provided by the present invention cleans a workpiece, the stirring rod rotates to improve the flowability of the molten salt. In combination with the ultrasonic impact of the ultrasonic application system, rapid removal of pollutants in the complex space of the workpiece and pollutants on the bottom layer of the surface is taking the accelerated, so that the cleaning efficiency is improved. Moreover, the improvement of the molten salt flowability can promote complete reaction between the unreacted paint and residues which float on the surface of the liquid level, and the molten salt, so that the quantity of generated waste gas is reduced. Reducing the quantity of the waste gas can reduce the processing cost of the waste gas and also can increase the environmental protection level of the cleaning machine.

Other features and advantages of the present invention will become apparent by the detailed description for exemplary embodiments of the present invention with reference to the following accompany drawings.

BRIEF DESCRIPTION OF THE ACCOMPANYING DRAWINGS

The accompanying drawings described here are provided for further understanding of the present invention and constitute a part of the application. The exemplary embodiments and description thereof of the present invention are intended to explain the present invention, but do not constitute inappropriate limitations to the present invention. In the accompanying drawings.

DETAILED DESCRIPTION

Figure 1:
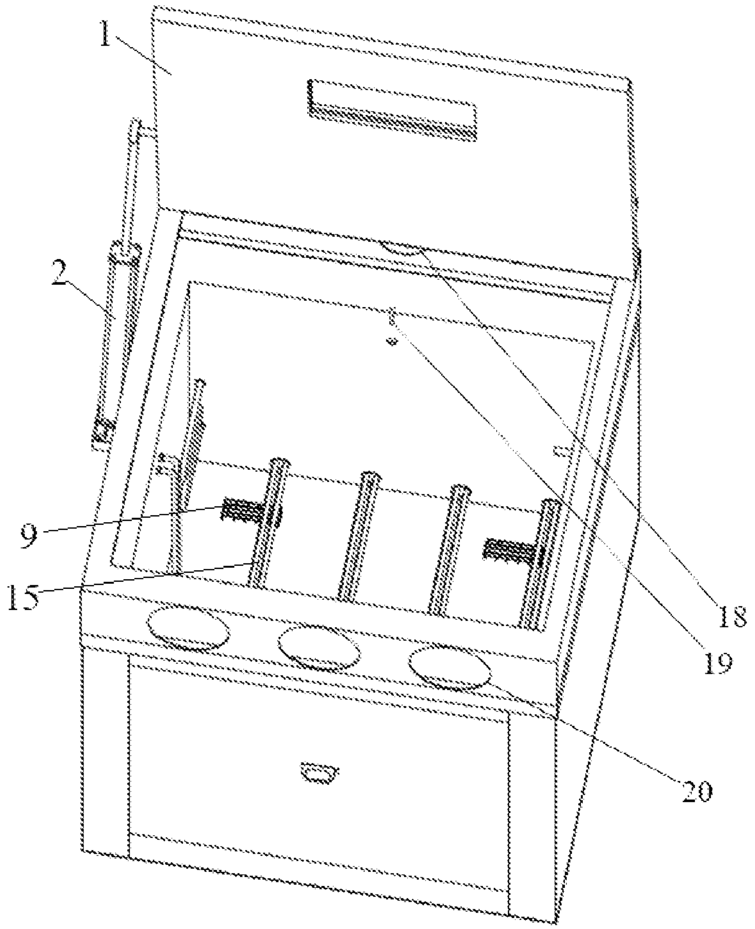
FIG. 1 is a schematic diagram of a three-dimensional structure of a molten salt ultrasonic cleaning machine according to an embodiment of the present invention.

The following clearly and completely describes the technical solutions in the embodiments of the present invention with reference to accompanying drawings in the embodiments of the present invention. Apparently, the described embodiments are merely a part rather than all of the embodiments of the present invention. The following description of the at least one exemplary embodiment is actually merely illustrative and never constitutes any limitation to the present invention and application or use thereof. All other examples obtained by a person of ordinary skill in the art based on the examples of the present invention without creative efforts shall fall within the protection scope of the present invention. All other examples obtained by a person of ordinary skill in the art based on the examples of the present invention without creative efforts shall fall within the protection scope of the present invention.

Unless otherwise specified, relative arrangement, numerical expressions and values of parts and steps described in the embodiments do not limit the scope of the present invention. Meanwhile, it should be understood that for the convenience of description, the dimensions of each part shown in the accompanying drawings are not drawn according to the actual proportional relationship. Technologies, methods and equipment known to those of ordinary skill in the related art may not be discussed in detail, but, where appropriate, the technologies, methods and equipment should be regarded as a part of the specification. In all the examples shown and discussed herein, any specific value should be interpreted as merely exemplary rather than a limitation. Therefore, other examples of the exemplary embodiments may have different values. It should be noted that similar reference numerals and letters represent similar items in the accompanying drawings below. Therefore, once an item is defined in one drawing, it is unnecessary to further discuss the item in the subsequent drawings.

For convenience of description, spatial relative terms, such as "above", "over", "on an upper surface of", "on" and the like, may be used herein to describe a spatial position relationship between one device or feature and other devices or features shown in the figure. It should be understood that the spatial relative terms are intended to include different orientations in use or operation in addition to the orientations of the devices described in the figures. For example, if the device in the drawings is inverted, the device described as "above other devices or structures" or "over other devices or structures" will be positioned as "below other devices or structures" or "under other devices or structures". Therefore, the exemplary terms "above" may include two orientations: "above" and "below". The device may also be positioned in other different ways, and the spatial relative description used herein will be explained accordingly.

Some parts have complex structures, pollutants such as paint and oil stain are accumulated at the grooves and chamfers, it is difficulty for ultrasonic wave to effectively impact into the grooves, chamfers and other complex spaces, pollutants on the surface and bottom layer of the parts have strong adhesive force, and the ultrasonic impact time is long, resulting in long cleaning time of the whole part and uncertainty of the cleaning time. The cleaning process is performed in a high-temperature environment, which will cause the high temperature of the parts and affect the magnetic property and the hole size precision of the parts. Therefore, an external force is urgently required to improve the flowability of the molten salt, thereby enhancing the removal efficiency of the polluted layer. At the same time, since the to-be-cleaned workpiece is rapidly immersed in the molten salt, a large amount of paint and oil stain on the surface layer of the surface of the workpiece are subjected to alkaline adsorption of the molten salt before incomplete reaction and is pushed to the liquid level under the action of newly generated gas and high-temperature heat to generate scum. There are interwoven bubbles between the scum and the molten salt liquid, so that the scum is in incomplete contact with the molten salt and cannot continue the reaction, but the scum will be pyrolyzed slowly in the tank body at high temperature, and the generation quantity of the waste gas is increased. In conclusion, due to the violent reaction of the pollutants on the surface layer of the surface of the parts, one layer of incompletely reacted paint and oil stain residues will be rapidly attached to the liquid surface of the molten salt tank, resulting in incomplete reaction of the pollutant residues, large generation quantity of the waste gas, and the problems of long cleaning time and low environmental protection level.

In view of this, the embodiments of the present invention provide a molten salt ultrasonic cleaning machine. Referring to FIG. 1 to FIG. 5, the molten salt ultrasonic cleaning machine includes a tank body 4, an ultrasonic application system, a molten salt heating system, and a stirring system, wherein the tank body 4 is configured to accommodate molten salt and a to-be-cleaned workpiece; the tank body 4 includes a bottom wall, and a side wall arranged circumferentially in a surrounding way; the ultrasonic application system is configured to apply ultrasonic impact to the to-be-cleaned workpiece in the tank body 4; the molten salt heating system is configured to heat the molten salt in the tank body 4; and the stirring system includes a stirring rod 10 which is rotatably arranged in the tank body 4.

When the molten salt ultrasonic cleaning machine provided by the embodiment of the present invention cleans a workpiece, the stirring rod 10 rotates to improve the flowability of the molten salt. In combination with the ultrasonic impact, rapid removal of pollutants in the complex space of the workpiece and pollutants on the bottom layer of the surface is accelerated, so that the cleaning efficiency is improved. Moreover, the improvement of the molten salt flowability can promote complete reaction between the unreacted paint and residues which float on the surface of the liquid level, and the molten salt, so that the quantity of generated waste gas is reduced. Reducing the quantity of the waste gas can reduce the processing cost of the waste gas and also can increase the environmental protection level of the cleaning machine.

Figure 5:
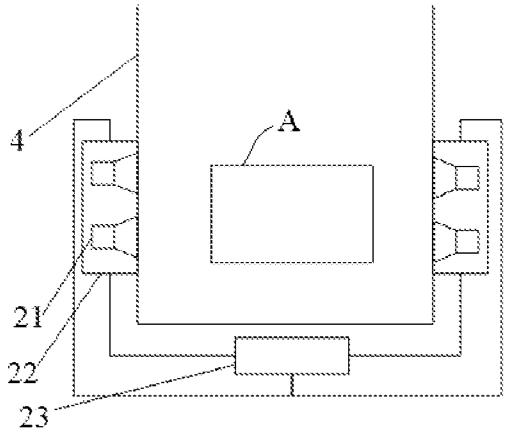
FIG. 5 is a structural schematic diagram of an ultrasonic application system of the molten salt ultrasonic cleaning machine shown in FIG. 1.

In some embodiments, referring to FIG. 5, the molten salt ultrasonic cleaning machine further includes an ultrasonic application system. The ultrasonic application system includes an ultrasonic vibrator 21 attached to the side wall so as to apply ultrasonic impact to the to-be-cleaned workpiece in the tank body 4.

In order to avoid a great influence on the quantity of the molten salt in the tank body 4 due to the setting of the stirring rod 10, in some embodiments, the stirring rod 10 is laid flat on the bottom wall, and a central axis and a rotation axis of the stirring rod 10 are perpendicular to each other. In this way, the stirring rod 10 occupies a small space in the tank body 4, which will not greatly affect the quantity of the molten salt in the tank body 4, so that it is unnecessary to enlarge the volume of the whole tank body 4 due to the stirring rod. Therefore, an existing molten salt ultrasonic cleaning machine is modified. The stirring rod 10 is laid flat on the bottom wall to stir the molten salt in the tank body 4 to a small extent, so that the flowability of the molten salt is improved on the basis of not affecting the reaction of the molten salt.

In other embodiments not shown in the drawings, the stirring rod may also be arranged on the side wall. Or the stirring rod may be arranged on the tank cover. When the tank cover is closed, the stirring rod on the tank cover is in contact with the molten salt, so that the stirring rod can rotate to stir the molten salt.

Figure 3:
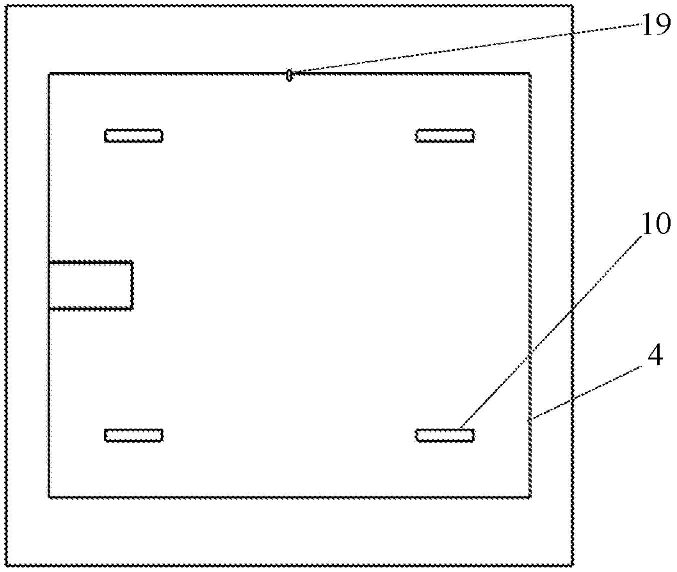
FIG. 3 is a distribution diagram of a stirring rod of the molten salt ultrasonic cleaning machine shown in FIG. 1 on a bottom wall of a tank body.

In order to stir the molten salt at different positions to improve the overall flowability of the molten salt, referring to FIG. 3, in some embodiments, the stirring system includes at least two stirring rods 10 which are uniformly distributed on the bottom wall.

Figure 2:
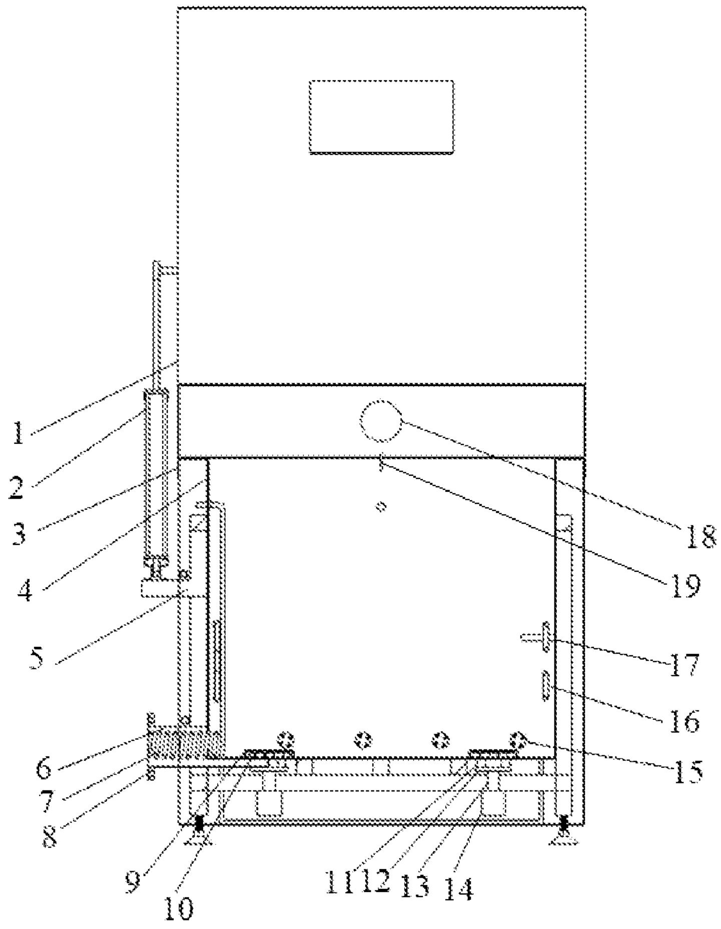
FIG. 2 is a section view of the molten salt ultrasonic cleaning machine shown in FIG. 1 when a tank cover is opened.

As shown in FIG. 2, in some embodiments, the stirring system further includes a protective net 9 covering an outer side of the stirring rod 10, wherein the protective net 9 is fixedly arranged on the bottom wall, and the stirring rod 10 is arranged inside the protective net 9, so the protective net 9 plays a role in fixing the position of the stirring rod, and the stirring rod 10 is prevented from losing control due to the excessively high rotating speed.

Figure 4:
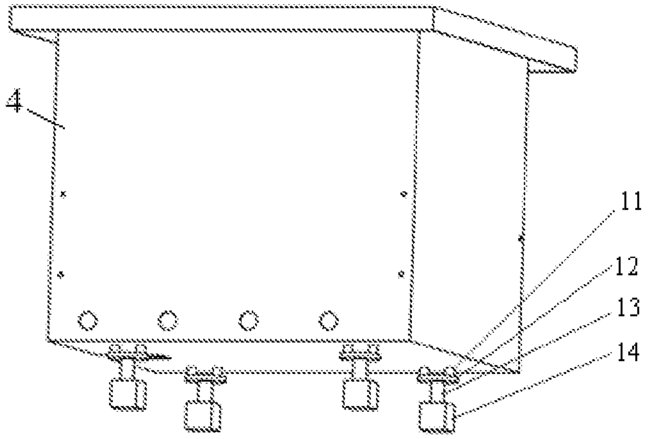
FIG. 4 is a section view of a three-dimensional structure of a driving assembly of a stirring rod of the molten salt ultrasonic cleaning machine shown in FIG. 1.

In some embodiments, referring to FIG. 2 and FIG. 4, the stirring system further includes a driving assembly arranged outside the bottom wall. The driving assembly is magnetically connected to the stirring rod 10 arranged inside the bottom wall. The driving assembly is arranged outside the bottom wall, so that the space in the tank body 4 is not occupied, and the influence on the quantity of the molten salt in the tank body due to the stirring system is further reduced. Moreover, the driving assembly of the stirring system is magnetically connected to the stirring rod 10 arranged inside the bottom wall, so it is unnecessary to perform hole opening on the bottom wall, thereby ensuring the sealing of the overall tank body 4. The quantity of waste gas generated in the process of cleaning the workpiece in the tank body 4 can be accurately detected only when the tank body 4 is ensured to be sealed, so that the cleaning process can be judged according to the quantity of the detected waste gas, and the molten salt ultrasonic cleaning machine can be automatically controlled.

Referring to FIG. 2 and FIG. 4, in some embodiments, the driving assembly includes a driving device, a magnet rotating disc 12 and at least two intermediate magnets 11. The magnet rotating disc 12 is connected to a main shaft of the driving device. The at least two intermediate magnets 11 are arranged between the magnet rotating disc 12 and the bottom wall. A first end of each intermediate magnet 11 is connected to the magnet rotating disc 12. A second end of the intermediate magnet 11 is arranged close to the bottom wall, but is not in contact with the bottom wall. That is, the second end of the intermediate magnet 11 and an outer surface of the bottom wall are arranged at intervals. The first end of the intermediate magnet 11 is connected to the magnet rotating disc 12 due to the magnetism opposite to that of the magnet rotating disc 12, and the second end of the intermediate magnet 11 is magnetically connected to the stirring rod 10 due to the magnetism opposite to that of the stirring rod 10, so that the stirring rod 10 can rotate with the magnet rotating disc 12 under the action of a magnetic force.

Specifically, the at least two intermediate magnets 11 include two intermediate magnets 11. The two intermediate magnets 11 are respectively a first intermediate magnet and a second intermediate magnet, which are correspondingly arranged at two ends of the stirring rod 10.

In some embodiments, the intermediate magnets 11 are magnet rods or magnet strips.

Referring to FIG. 1 and FIG. 2, in some embodiments, the molten salt ultrasonic cleaning machine further includes a tank body shell 3 and a tank frame 5. The tank body 4 is mounted on the tank frame 5, and the tank body shell 3 is arranged outside the tank body 4 to package the tank body 4. The driving assembly is arranged between an inner side of a bottom surface of the tank body shell 3 and the tank body 4. The driving assembly is mounted on the tank frame 5.

Since the temperature of the molten salt is very high when the molten salt ultrasonic cleaning machine works, in some embodiments, the stirring rod 10 includes a stirring rod body and a coating arranged outside the stirring rod body. The stirring rod body is made of samarium cobalt magnet, and the coating is made of nanometer ceramic. The samarium cobalt magnet resists a high temperature of 350° C. In other embodiments, the stirring rod body may also be made of other high-temperature-resistant magnet materials. The stirring rod 10 in this embodiment is laid flat on the bottom wall, so the coating outside the stirring rod body is in direct contact with the bottom wall. In order to reduce the friction between the stirring rod 10 and the bottom wall, the coating is made of a low-friction material. Further, in order to protect the strong magnetic property of the stirring rod body at high temperature, the coating is also made of high-temperature-resistant, heat-insulating and alkali-resistant materials.

In some embodiments, the molten salt ultrasonic cleaning machine further includes a gas sensor 19 and a controller. The gas sensor 19 is configured to monitor the quantity of the waste gas generated in the workpiece cleaning process, and the controller controls the rotating speed of the stirring rod 10 according to the quantity of the waste gas. For example, the controller turns on the stirring system when the quantity of the waste gas is in a set range, so that the stirring rod starts to rotate, and the molten salt in the tank body 4 is slightly stirred. The controller turns off the stirring system and the ultrasonic application system to end cleaning when the quantity of the waste gas is less than a minimum of the set range.

In some embodiments, the molten salt ultrasonic cleaning machine further includes a tank cover 1. The tank cover 1 is openably arranged relative to the tank body 4 to close or open the tank body 4. When the molten salt ultrasonic cleaning machine is in a cleaning state, the tank cover 1 closes the tank body 4. The gas sensor is configured to monitor the quantity of the waste gas in the tank body in the workpiece cleaning process, and the controller controls the rotating speed of the stirring rod 10 according to the quantity of the waste gas. That is, the tank cover 1 closes the tank body 4, so that the whole cleaning reaction of the molten salt ultrasonic cleaning machine is performed in a closed space, and the gas sensor 19 can accurately monitor the quantity of the comprehensive waste gas in the tank body 4.

Figure 6:
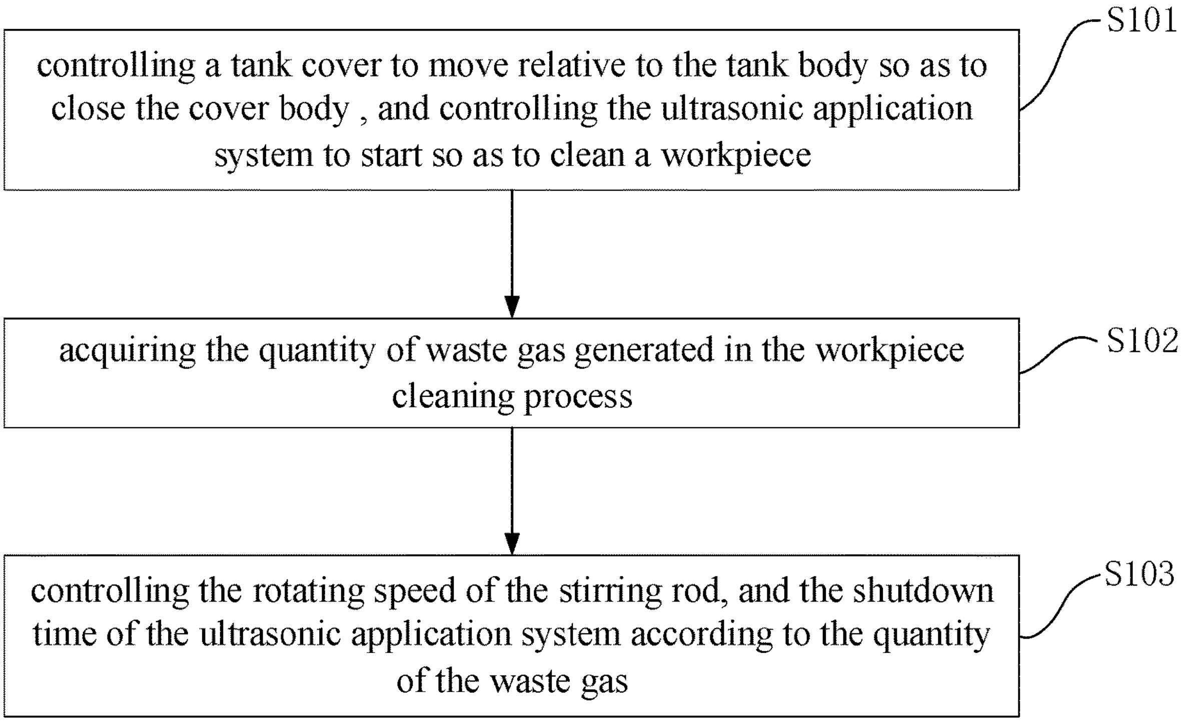
FIG. 6 is a step diagram of a molten salt ultrasonic cleaning method according to some embodiments of the present invention.

Referring to FIG. 6, the embodiments of the present invention further provide a molten salt ultrasonic cleaning method. the molten salt ultrasonic cleaning method includes the following steps: S101: controlling a tank cover to move relative to the tank body so as to close the cover body, and controlling the ultrasonic application system to start so as to clean a workpiece; S102: acquiring the quantity of waste gas generated in the workpiece cleaning process; and S103: controlling the rotating speed of the stirring rod and the shutdown time of the ultrasonic application system according to the quantity of the waste gas.

According to the molten salt ultrasonic cleaning method provided by the embodiments of the present invention, the tank body for cleaning of the tank body is closed, so that the quantity of the waste gas generated in the workpiece cleaning process can be acquired accurately, and the controller can control the rotating speed of the stirring rod according to the quantity of the waste gas to realize automatic cleaning.

Specifically, the quantity of the waste gas generated in the workpiece cleaning process is acquired by the gas sensor 19.

In some embodiments, the step of controlling the rotating speed of the stirring rod according to the quantity of the waste gas includes: turning on the stirring system by a controller to rotate the stirring rod when the quantity of the waste gas is in a set range; and turning off the stirring system and the ultrasonic application system by the controller to end cleaning when the quantity of the waste gas is less than a minimum of the set range.

For example, when the generation quantity of the comprehensive waste gas in the tank is greater than 0.5 $mg/m^3$ and less than 5 $mg/m^3$, the stirring system is turned on, and the rotating speed of the stirring rod is adjusted by the controller, thereby ensuring that the molten salt in the tank body is slightly stirred, and promoting rapid removal of the pollutants in the complex space of the parts and the pollutants on the bottom layer of the surface and complete reaction of the pollutant residues on the liquid surface. As the reaction of the pollutants on the surfaces of the parts gradually slows down, when the generating quantity of the comprehensive waste gas in the tank is less than 0.5 $mg/m^3$, the magnetic stirring system and the ultrasonic application system are turned off. Certainly, in other embodiments, the setting range of the waste gas quantity may be changed according to the type of the to-be-cleaned workpiece.

The structure and the working process of the molten salt ultrasonic cleaning machine according to one specific embodiment of the present invention are described in detail below according to FIG. 1 to FIG. 5.

As shown in FIG. 1 to FIG. 5, the molten salt ultrasonic cleaning machine provided by the embodiments of the present invention includes a cleaning machine main body, a stirring system, an ultrasonic application system, a waste gas collecting system, a molten salt heating system and a salt discharging system, wherein the cleaning machine main body is configured to store molten salt and a to-be-cleaned workpiece. As shown in FIG. 1 and FIG. 2, the cleaning machine main body includes a tank cover 1, an air cylinder 2, a tank body shell 3, a tank body 4 and a tank frame 5. The tank body 4 is made of corrosion-resistant stainless steel. The tank body 4 is mounted on the tank frame 5. Moreover, the tank body 4 is packaged by the tank body shell 3 to reduce the external noise of the cleaning machine. The tank cover 1 is hinged on the tank frame 5 through the air cylinder 2, and the air cylinder 2 acts to control the tank cover 1 to automatically turn on and off.

The stirring system is configured to stir the molten salt in the tank body 4 to improve the flowability of the molten salt. The stirring system includes a protective net 9, a stirring rod 10, an intermediate magnet 11, a magnet rotating disc 12, a motor main shaft 13 and a motor 14. As shown in FIG. 3, in this embodiment, the stirring system includes four stirring rods 10 which are respectively arranged at four corners of the bottom of the tank body 4 to stir the molten salt at different stirring positions.

Specifically, the stirring rod 10 is laid flat on the bottom surface of the tank body 4. Moreover, an outer side of the stirring rod 10 is covered with the protective net 9. The protective net 9 is fixedly mounted on the bottom wall, so that the position of the stirring rod 10 can be fixed, and the stirring rod 10 can be prevented from losing control due to excessively high rotating speed.

As shown in FIG. 4, the stirring system further includes a driving assembly for driving the stirring rod 10 to rotate. The driving assembly includes a motor 14, a magnet rotating disc 12 and an intermediate magnet 11. The motor main shaft 13 of the motor 14 is connected to the magnet rotating disc 12 to drive the magnet rotating disc 12 to rotate. The intermediate magnet 11 is connected to a top surface of the magnet rotating disc 12 by virtue of a magnetic force, and the stirring rod 10 and the top end of the intermediate magnet 11 attract each other due to the opposite magnetisms, so that the stirring rod 10 is driven by the magnetic force to rotate to stir the molten salt in the tank body 4, thereby promoting rapid removal of the pollutants in the complex space of the workpiece and the pollutants on the bottom layer of the surface. Furthermore, complete reaction of the pollutant residues on the liquid surface can be promoted.

The rotating speed of the magnet rotating disc 12 is controlled and adjusted by the controller, so that the rotating speed of the stirring rod 10 in the tank body 4 is controlled. Specifically, the stirring power $P_{stirring}$ of the stirring rod 10 is determined according to the average stirring power $P_0$ of liquid per unit volume. $P_{stirring}=K*P_0*V_{liquid+workpiece}$, wherein K is correction coefficient; when a heating pipe and a protective frame are arranged above the stirring rod 10 and the bottom wall of the tank body is rough and uneven, the value range of K is 2-3; and $V_{liquid+workpiece}$ is the sum of the volume of the molten salt in the tank body and the volume of the workpiece.

The stirring rod 10 includes a stirring rod body located inside, and a coating arranged outside a stirring rod main body. The stirring rod main body is made of a high-temperature-resistant magnet, for example, a samarium cobalt magnet capable of resisting high temperature of 350° C. The coating is made of low-friction, high-temperature-resistant, heat-insulating and alkali-resistant materials, such as nanometer ceramic. The coating can reduce the friction between the stirring rod 10 and the bottom wall of the tank body 4 and protect the strong magnetic property of the stirring rod main body at high temperature.

The ultrasonic application system is configured to apply ultrasonic impact to the workpiece in the tank body 4 so as to rapidly remove the pollutants on the surface of the workpiece. As shown in FIG. 5, the ultrasonic application system includes an ultrasonic vibrator 21, an ultrasonic vibrator box 22 and a circulating cooling system 23. The ultrasonic vibrator 21 is attached to the outer side of the tank body 4. The ultrasonic vibrator box 22 is arranged outside the ultrasonic vibrator 21. The circulating cooling system 23 is configured to continuously cool the ultrasonic vibrator 21 so as to ensure that the ultrasonic vibrator 21 works at the temperature of 40° C.-60° C., and is combined with the ultrasonic application system and the stirring system so as to accelerate removal of the pollutants on the bottom layer and realize complete reaction of the scum on the liquid surface.

The waste gas collecting system is configured to collect and treat waste gas generated in the cleaning process. As shown in FIG. 2, the waste gas collecting system includes a gas extracting module 18, a gas sensor 19 and a gas blowing module 20, wherein the gas extracting module 18 is mounted on a rear side of the tank body and includes an exhaust fan for gas extraction; and the gas blowing module 20 is mounted on a front side of the tank body and includes a supply fan for gas blowing. The waste gas generated in the tank is timely collected through the gas blowing module 20 and the gas extracting module 18, and then is conveyed to a waste gas treatment device for environmental protection treatment. The gas sensor 19 is arranged on a lower side of the gas extracting module 18 for monitoring the quantity of the waste gas generated in the cleaning process. For example, the gas sensor 19 may be an infrared gas sensor.

Specifically, a flow path of the waste gas is formed from the gas blowing module 20 to the gas extracting module 18, and the gas sensor 19 is arranged on the flow path of the waste gas, so that the quantity of the waste gas can be monitored accurately. As shown in FIG. 1, the gas sensor 19 is arranged close to the gas extracting module 18.

The controller is coupled with the gas sensor 19. The controller may adjust the rotating speed of the stirring rod 10 according to the waste gas quantity measured by the gas sensor 19 so as to ensure that the molten salt in the tank body 4 is slightly stirred and promote rapid removal of the pollutants in the complex space of the workpiece and the pollutants on the bottom layer of the surface.

The molten salt heating system is configured to heat the tank body, so that the molten salt in the tank body is efficiently molten and the cleaning temperature is maintained. The molten salt heating system includes a tank bottom heating pipe 15, a side wall heating pipe 16 and a temperature sensor 17. The controller controls the heating power of the tank bottom heating pipe 15 and/or the side wall heating pipe 16 according to the temperature measured by the temperature sensor 17 so as to control the cleaning temperature in the tank body.

The salt discharging system is configured to discharge the molten salt in the tank body. The salt discharging system includes a salt discharging valve heat-insulating layer 6, a salt discharging valve heating pipe 7 and a salt discharging valve 8. The salt discharging valve 8 is mounted at the bottom of the side wall of the tank body, and the melting and efficient discharge of the molten salt in the salt discharging valve are ensured by the discharging valve heating pipe 7 and the salt discharging valve heat-insulating layer 6.

According to the molten salt ultrasonic cleaning machine provided by this embodiment, the stirring system applies a stirring effect to improve the flowability of the molten salt. In combination with the ultrasonic impact of the ultrasonic application system, rapid removal of the pollutants in the complex space of the parts and the pollutants on the bottom layer of the surface is accelerated, and complete reaction of the residues floating on the liquid surface and the molten salt is promoted. The cleaning time is automatically controlled through the gas sensor, the cleaning efficiency of the cleaning machine is improved, and the automation and environmental protection levels are increased. The pollutants such as paint, oil stain and carbon deposit on the surfaces of the parts are cleaned more completely, so that environmental-friendly, efficient and automatic cleaning of the pollutants on the surfaces of the parts is realized.

In this embodiment, the cleaning method of the molten salt ultrasonic cleaning method includes the following steps: step a: opening a tank cover and adding industrial salt; step b: closing the tank cover, turning on a circulating cooling system of an ultrasonic application system and a molten salt heating system, and heating the industrial salt by a heating pipe to 280° C.-300° C.; step c: opening the tank cover and turning on a waste gas collecting system, and putting a to-be-cleaned workpiece into molten salt; step d: closing the tank cover, turning on the ultrasonic application system, and starting to clean the to-be-cleaned workpiece; step e: monitoring the generation quantity of the waste gas in the tank through a gas sensor in the waste gas collecting system, turning on the stirring system when the generation quantity of the comprehensive waste gas in the tank is greater than 0.5 mg/m$^3$ and less than 5 mg/m$^3$, and adjusting the rotating speed of the stirring rod by the controller, thereby ensuring that the molten salt in the tank body is slightly stirred, and promoting rapid removal of the pollutants in the complex space of the parts and the pollutants on the bottom layer of the surface and complete reaction of the pollutant residues on the liquid surface; step f: as the reaction of the pollutants on the surfaces of the parts gradually slows down, turning off the magnetic stirring system and the ultrasonic application system when the generating quantity of the comprehensive waste gas in the tank is less than 0.5 mg/m$^3$, opening the tank cover, taking out the cleaned workpieces, and then conveying the workpieces to a clean water tank, an acid cleaning tank and other after-treatment systems for further precise cleaning; and step g: turning off the molten salt heating system and the waste gas collecting system, and closing the tank cover and turning of a power supply of the cleaning machine when the temperature of the molten salt in the tank is less than 50° C.

In summary, according to the molten salt ultrasonic cleaning machine provided by this embodiment, the stirring system applies a stirring effect to improve the flowability of the molten salt. In combination with the ultrasonic impact of the ultrasonic application system, the cleaning efficiency of the pollutants in the complex space of the workpiece and the pollutants on the bottom layer of the surface can be improved. Furthermore, the molten salt ultrasonic cleaning machine monitors the quantity of the waste gas generated in the cleaning process through the gas sensor, and automatically controls the starting time of the stirring system and the cleaning ending time, so that the cleaning machine can be automatically controlled. Moreover, due to the stirring system, the incompletely reacted residues such as the paint and oil stain on the liquid surface can be promoted to further react with the molten salt, and the generation quantity of the waste gas can be reduced. In addition, the waste gas collecting system can timely collect the waste gas generated in the tank, so that the environmental protection level of the cleaning machine can be increased.

Finally, it should be noted that the above embodiments are only used to describe the technical solutions of the present invention, but not to limit them; although the present invention is described in detail with reference to the preferred embodiments, those of ordinary skill in the art should understand: the specific implementations of the present invention still can be modified or part of technical features can be equivalently reaccommodated; and without departing from the spirit of the technical solutions of the present invention, those modifications or equivalent reaccommodatements should be covered within the scope of the technical solutions claimed by the present invention.

The invention claimed is:

1. A molten salt ultrasonic cleaning machine, comprising:

a tank body, configured to accommodate molten salt and a to-be-cleaned workpiece, and comprising a bottom wall, and a side wall arranged circumferentially in a surrounding way;

an ultrasonic application system, configured to apply ultrasonic impact to the to-be-cleaned workpiece in the tank body;

a molten salt heating system, configured to heat the molten salt in the tank body; and a stirring system, comprising a stirring rod which is rotatably arranged in the tank body, wherein the molten salt ultrasonic cleaning machine further comprises a tank cover, a gas sensor, and a controller, wherein the tank cover is arranged relative to the tank body to close or open the tank body, and wherein when the molten salt ultrasonic cleaning machine is in a cleaning state, the tank cover closes the tank body, the gas sensor monitors a quantity of waste gas generated in a workpiece cleaning process, and the controller controls a rotating speed of the stirring rod according to the quantity of the waste gas.

2. The molten salt ultrasonic cleaning machine according to claim 1, wherein the stirring rod is laid flat on the bottom wall, and a central axis and a rotation axis of the stirring rod are perpendicular to each other.

3. The molten salt ultrasonic cleaning machine according to claim 1, wherein the stirring system further comprises a driving assembly arranged outside the bottom wall, and the driving assembly is magnetically connected to the stirring rod arranged inside the bottom wall.

4. The molten salt ultrasonic cleaning machine according to claim 3, wherein the driving assembly comprises a driving device, a magnet rotating disc, and at least two intermediate magnets; and wherein the magnet rotating disc is connected to a main shaft of the driving device the at least two intermediate magnets are arranged on one side of the magnet rotating disc proximate to the bottom wall, the first end of each intermediate magnet is connected to the magnet rotating disc due to the magnetism opposite to that of the magnet rotating disc, and the second end of each intermediate magnet is magnetically connected to the stirring rod due to the magnetism opposite to that of the stirring rod, so that the stirring rod is driven by a magnetic force to rotate with the magnet rotating disc.

5. The molten salt ultrasonic cleaning machine according to claim 4, wherein a first end of each intermediate magnet is connected to the magnet rotating disc, and a second end of each intermediate magnet is not in contact with the bottom wall.

6. The molten salt ultrasonic cleaning machine according to claim 4, wherein the at least two intermediate magnets comprise a first intermediate magnet and a second intermediate magnet, wherein the first intermediate magnet and a first end of the stirring rod are arranged correspondingly, and wherein the second intermediate magnet and a second end of the stirring rod are arranged correspondingly.

7. The molten salt ultrasonic cleaning machine according to claim 1, wherein the stirring rod comprises a stirring rod body and a coating arranged outside the stirring rod body, and wherein the stirring rod body is made of samarium cobalt magnet, and the coating is made of nanometer ceramic.

8. The molten salt ultrasonic cleaning machine according to claim 1, wherein the stirring system further comprises a protective net covering an outer side of the stirring rod, and wherein the protective net is fixedly arranged on the bottom wall.

9. The molten salt ultrasonic cleaning machine according to claim 1, wherein the stirring system comprises at least two stirring rods which are uniformly distributed on the bottom wall.

10. The molten salt ultrasonic cleaning machine according to claim 1, wherein the ultrasonic application system comprises an ultrasonic vibrator attached to the side wall.

11. The molten salt ultrasonic cleaning machine according to claim 1, wherein the controller controls the shutdown time of the ultrasonic application system according to the quantity of the waste gas.

12. The molten salt ultrasonic cleaning machine according to claim 1, wherein the controller controls the rotating speed of the stirring rod according to the quantity of the waste gas by turning on the stirring system when the quantity of the waste gas is in a set range, and turning off the stirring system and the ultrasonic application system to end cleaning when the quantity of the waste gas is less than a minimum of the set range.

* * * * *